(12) United States Patent
Gan

(10) Patent No.: US 12,126,444 B2
(45) Date of Patent: Oct. 22, 2024

(54) APPARATUS FOR RETRANSMISSION OF A MEDIA ACCESS CONTROL PROTOCOL DATA UNIT (MPDU) OF AN AGGREGATED MEDIA ACCESS CONTROL PROTOCOL DATA UNIT (A-MPDU)

(71) Applicant: Huawei Technologies Co., Ltd., Shenzhen (CN)

(72) Inventor: Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 17/579,195

(22) Filed: Jan. 19, 2022

(65) Prior Publication Data

US 2022/0149991 A1    May 12, 2022

Related U.S. Application Data

(63) Continuation of application No. PCT/CN2020/102263, filed on Jul. 16, 2020.

(30) Foreign Application Priority Data

Jul. 19, 2019  (CN) .......................... 201910657446.4

(51) Int. Cl.
    *H04L 1/08*    (2006.01)
(52) U.S. Cl.
    CPC ...................................... *H04L 1/08* (2013.01)
(58) Field of Classification Search
    CPC ......... H04L 1/08; H04L 1/1858; H04L 1/189;
                H04L 1/00; H04L 1/16; H04L 1/18;
                H04L 1/1896; H04L 1/1614; H04L
                                                    1/1845
    See application file for complete search history.

(56) References Cited

U.S. PATENT DOCUMENTS

| 9,876,614 | B1 | 1/2018 | Sun et al. |
| 2014/0126580 | A1 | 5/2014 | Sampath et al. |

(Continued)

FOREIGN PATENT DOCUMENTS

| CN | 103701574 A | 4/2014 |
| CN | 105471549 A | 4/2016 |

(Continued)

OTHER PUBLICATIONS

"IEEE P802.11ax™/D2.2, Draft Standard for Information technology—Telecommunications and information exchange between systems Local and metropolitan area networks—Specific requirements, Part 11: Wireless LAN Medium Access Control(MAC) and Physical Layer (PHY) Specifications, Amendment 6: Enhancements for High Efficiency WLAN," total 620 pages, IEEE, Institute of Electrical and Electronics Engineers, New York, New York (Feb. 2018).

(Continued)

*Primary Examiner* — Mewale A Ambaye
(74) *Attorney, Agent, or Firm* — Leydig, Voit & Mayer, Ltd.

(57) ABSTRACT

A data unit sending or receiving method and a related apparatus that belong to the field of communication technologies are provided. In this solution, a transmit end sends a first aggregated media access control protocol data unit (A-MPDU) and determines an MPDU that needs to be retransmitted in the first A-MPDU. The MPDU that needs to be retransmitted is included in a first A-MPDU subframe in the first A-MPDU. The first A-MPDU subframe includes a first MPDU delimiter, and the first MPDU delimiter includes a first end of frame (EOF) field and a first MPDU length field. The transmit end sends a second A-MPDU, where the second A-MPDU includes a second A-MPDU subframe, the second A-MPDU subframe includes the MPDU that needs to be retransmitted and a second MPDU delimiter, and the (Continued)

second MPDU delimiter includes a second EOF field and a second MPDU length field.

18 Claims, 9 Drawing Sheets

(56) References Cited

U.S. PATENT DOCUMENTS

| | | | |
|---|---|---|---|
| 2017/0048048 A1* | 2/2017 | Seok | H04L 1/1607 |
| 2017/0126363 A1 | 5/2017 | Wang et al. | |
| 2018/0254861 A1* | 9/2018 | Cherian | H04L 1/1854 |
| 2020/0396025 A1* | 12/2020 | Sun | H04L 1/1664 |
| 2021/0075542 A1* | 3/2021 | Kneckt | H04L 1/0061 |
| 2021/0091887 A1* | 3/2021 | Cho | H04L 1/0061 |
| 2023/0146240 A1* | 5/2023 | Noh | H04L 1/08 370/329 |

FOREIGN PATENT DOCUMENTS

| | | | |
|---|---|---|---|
| CN | 106464434 A | 2/2017 | |
| EP | 3349505 A1 | 7/2018 | |
| WO | WO-2015142932 A1 * | 9/2015 | H04L 1/0025 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11™-2016, total 3534 pages, IEEE, Institute of Electrical and Electronics Engineers, New York, New York (Approved Dec. 7, 2016).

* cited by examiner

APPARATUS FOR RETRANSMISSION OF A MEDIA ACCESS CONTROL PROTOCOL DATA UNIT (MPDU) OF AN AGGREGATED MEDIA ACCESS CONTROL PROTOCOL DATA UNIT (A-MPDU)

CROSS-REFERENCE TO RELATED APPLICATIONS

This application is a continuation of International Application No. PCT/CN2020/102263, filed on Jul. 16, 2020, which claims priority to Chinese Patent Application No. 201910657446.4, filed on Jul. 19, 2019. The disclosures of the aforementioned applications are hereby incorporated by reference in their entireties.

TECHNICAL FIELD

This application relates to the field of communication technologies, and in particular, to a data unit sending method, a data unit receiving method, and an apparatus.

BACKGROUND

In a communication system, signal transmission fails due to a time variant characteristic and multipath fading of a wireless channel. Error control is usually performed by using methods such as a forward error correction (FEC) encoding technology and an automatic repeat request (ARQ). For example, in a wireless local area network (WLAN), when an access point (AP) sends data to a station (STA), if the STA successfully receives the data, the STA feeds back an acknowledgment (Acknowledge, ACK) frame to the AP; and if the STA fails to receive the data, the STA does not feed back any frame. If the AP does not receive any feedback, the AP retransmits the sent data to perform error control.

Based on the ARQ, a hybrid automatic repeat request (Hybrid ARQ, HARQ) technology is further introduced into standards such as LTE (Long Term Evolution). A receive end prestores previously received data; and when receiving retransmitted data, the receive end combines the previously received data and the received retransmitted data, to increase a success rate of decoding. Because the HARQ may further increase a success rate of receiving the retransmitted data, the HARQ mechanism is usually used in a deep fading area or an edge area in a wireless network; and the mechanism usually enables a transmit end to use a high modulation and coding scheme (MCS), to improve transmission efficiency.

The HARQ requires buffer to store data that needs to be combined. Therefore, the HARQ mechanism is not introduced in previous standards such as 802.11a/g/n/ac/ax. In a future WLAN system, for example, the next-generation WLAN system in which the 802.11be standard is applied, due to improvement of hardware performance, the HARQ technology that can improve transmission reliability and efficiency is likely to be selected as one of technologies of a next-generation Wi-Fi standard. Therefore, how to design a HARQ mechanism applicable to a WLAN system is very important.

SUMMARY

Embodiments of this application provide a data unit method and apparatus, which are applicable to a WLAN system, and can implement HARQ transmission in the WLAN system, thereby improving transmission reliability and efficiency. The technical solutions are as follows:

According to a first aspect, a data unit sending method applied to a transmit end is provided, including: sending a first aggregated media access control protocol data unit (A-MPDU); determining an MPDU that needs to be retransmitted in the first A-MPDU, where the MPDU that needs to be retransmitted is included in a first A-MPDU subframe in the first A-MPDU, the first A-MPDU subframe includes a first MPDU delimiter, and the first MPDU delimiter includes a first end of frame (EOF) field and a first MPDU length field; and sending a second A-MPDU, where the second A-MPDU includes a second A-MPDU subframe, the second A-MPDU subframe includes the MPDU that needs to be retransmitted and a second MPDU delimiter, and the second MPDU delimiter includes a second EOF field and a second MPDU length field. A value of the second EOF field is the same as a value of the first EOF field, and a value of the second MPDU length field is the same as a value of the second MPDU length field.

According to a second aspect, a data unit receiving method applied to a receive end is provided, including: receiving a first aggregated media access control protocol data unit A-MPDU; receiving a second A-MPDU, where the second A-MPDU includes a second A-MPDU subframe, the second A-MPDU subframe includes an MPDU that needs to be retransmitted in the first A-MPDU, the MPDU that needs to be retransmitted is included in a first A-MPDU subframe of the first A-MPDU, the first A-MPDU subframe includes a first MPDU delimiter, the first MPDU delimiter includes a first EOF field and a first MPDU length field, the second A-MPDU subframe includes a second MPDU delimiter, and the second MPDU delimiter includes a second EOF field and a second MPDU length field, where a value of the second EOF field is the same as a value of the first EOF field, and a value of the second MPDU length field is the same as a value of the second MPDU length field; and performing combining and decoding or joint decoding on a log-likelihood ratio (LLR) of a coded bit corresponding to the first A-MPDU subframe and an LLR of a coded bit corresponding to the second A-MPDU subframe, to obtain the MPDU that needs to be retransmitted.

According to a third aspect, a sending apparatus is provided, including: a sending module, configured to send a first aggregated media access control protocol data unit A-MPDU; and a processing module, configured to determine an MPDU that needs to be retransmitted in the first A-MPDU, where the MPDU that needs to be retransmitted is included in a first A-MPDU subframe in the first A-MPDU, the first A-MPDU subframe includes a first MPDU delimiter, and the first MPDU delimiter includes a first EOF field and a first MPDU length field. The sending module is further configured to send a second A-MPDU, where the second A-MPDU includes a second A-MPDU subframe, the second A-MPDU subframe includes the MPDU that needs to be retransmitted and a second MPDU delimiter, and the second MPDU delimiter includes a second EOF field and a second MPDU length field. A value of the second EOF field is the same as a value of the first EOF field, and a value of the second MPDU length field is the same as a value of the second MPDU length field.

According to a fourth aspect, a receiving apparatus is provided, including: a receiving module, configured to receive a first aggregated media access control protocol data unit A-MPDU, where the receiving module is further configured to receive a second A-MPDU, where the second A-MPDU includes a second A-MPDU subframe, the second A-MPDU subframe includes an MPDU that needs to be retransmitted in the first A-MPDU, the MPDU that needs to be retransmitted is included in a first A-MPDU subframe of the first A-MPDU, the first A-MPDU subframe includes a first MPDU delimiter, the first MPDU delimiter includes a first EOF field and a first MPDU length field, the second A-MPDU subframe includes a second MPDU delimiter, and the second MPDU delimiter includes a second EOF field and a second MPDU length field, where a value of the second EOF field is the same as a value of the first EOF field, and a value of the second MPDU length field is the same as a value of the second MPDU length field; and a processing module, configured to perform combining and decoding or joint decoding on a log-likelihood ratio LLR of a coded bit corresponding to the first A-MPDU subframe and an LLR of a coded bit corresponding to the second A-MPDU subframe, to obtain the MPDU that needs to be retransmitted.

According to the method or apparatus in any one of the foregoing aspects, an information bit of a retransmitted MPDU is the same as an information bit of a previously transmitted MPDU, so that the receive end may perform combining and decoding or joint decoding on LLRs of coded bits that are transmitted twice, thereby implementing a HARQ mechanism applicable to a WLAN system and improving transmission reliability of the WLAN system.

With reference to any one of the foregoing aspects, in a possible design, the first A-MPDU subframe includes a first padding field, the second A-MPDU subframe includes a second padding field, and a value of the first padding field is the same as a value of the second padding field.

With reference to any one of the foregoing aspects, in a possible design, a value of a retry bit in a frame header of the MPDU that needs to be retransmitted in the second A-MPDU is the same as a value of a retry bit in a frame header of the MPDU that needs to be retransmitted in the first A-MPDU.

With reference to any one of the foregoing aspects, the value of the retry bit in the frame header of the MPDU that needs to be retransmitted in the second A-MPDU is set to 0.

With reference to any one of the foregoing aspects, a value of a buffered traffic size field in the frame header of the MPDU that needs to be retransmitted in the second A-MPDU is the same as a value of a buffered traffic size field in the frame header of the MPDU that needs to be retransmitted in the first A-MPDU.

With reference to any one of the foregoing aspects, if each MPDU in the first A-MPDU is the MPDU that needs to be retransmitted, the second A-MPDU further includes a second end of frame padding field located after the second A-MPDU subframe, and the first A-MPDU further includes a first end of frame padding field located after the first A-MPDU subframe, where a value of the second end of frame padding field is the same as a value of the first end of frame padding field. Optionally, the first A-MPDU is carried in a first physical layer protocol data unit (PPDU), and the second A-MPDU subframe is carried in a second PPDU. The first PPDU includes a first pre-FEC padding located after the first A-MPDU, and the second PPDU includes a second pre-FEC padding located after the second A-MPDU, where the first pre-FEC padding is the same as the second pre-FEC padding.

According to a fifth aspect, a sending apparatus applied to a transmit end is provided, including: a memory and a processor, where the memory is coupled to the processor, the memory is configured to store a computer program, the computer program includes program instructions, and the processor is configured to invoke the program instructions, to implement the method according to the first aspect.

According to a sixth aspect, a receiving apparatus applied to a receive end is provided, including: a memory and a processor, where the memory is coupled to the processor, the memory is configured to store a computer program, the computer program includes program instructions, and the processor is configured to invoke the program instructions, to implement the data transmission method according to the second aspect.

According to a seventh aspect, a computer-readable storage medium is provided, where the computer-readable storage medium stores a computer program, the computer program includes at least one segment of code, and the at least one segment of code may be executed by a computer, to control the computer to perform the method according to any one of the first aspect or the second aspect.

According to an eighth aspect, a computer program is provided, where when the computer program is executed by a computer, the computer is enabled to perform the method according to the first aspect or the second aspect.

Optionally, all or a part of the computer program may be stored in a storage medium that is packaged together with a processor, or may be stored in a memory that is not packaged together with a processor.

According to a ninth aspect, a chip is provided, including a processor, where the chip is configured to invoke, from a memory, and run instructions stored in the memory, so that a communication device on which the chip is installed performs the method according to the first aspect or the second aspect.

According to a tenth aspect, a chip is provided, including an input interface, an output interface, and a processing circuit. Optionally, the chip further includes a memory, where the input interface, the output interface, the processing circuit, the memory are connected through an internal connection path; and the processor is configured to execute code in the memory. When the code is executed, the processing circuit is configured to perform the method according to the first aspect or the second aspect.

According to an eleventh aspect, an apparatus is provided. The apparatus is configured to implement the method according to any one of the foregoing aspects.

In technical solutions of this application, a HARQ mechanism applicable to a structure of an A-MPDU in a WLAN system is implemented to improve transmission reliability and efficiency of the WLAN system.

DESCRIPTION OF EMBODIMENTS

Figure 1:
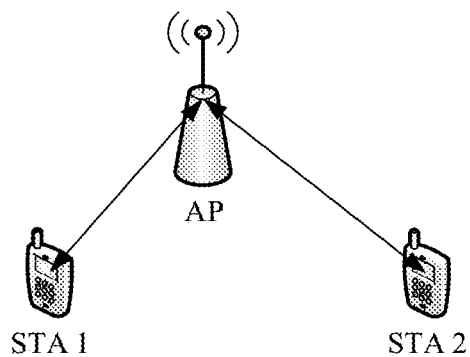
FIG. 1 is a schematic diagram of an application scenario according to an embodiment of this application.

To make objectives, technical solutions, and advantages of this application clearer, the following further describes implementations of this application in detail with reference to accompanying drawings.

In a wireless communication system, signal transmission fails due to a time variant characteristic and multi-path fading of a wireless channel. Therefore, error control is usually performed by using methods such as a forward error correction (FEC) encoding technology and an automatic repeat request (ARQ).

A retransmission technology means that a transmit end resends data that is not successfully received or correctly received by a receive end. The retransmission technology may include the ARQ and a HARQ. Compared with the ARQ, the HARQ may further increase a success rate of receiving retransmitted data. The HARQ technology in LTE generally has two implementations: chase combining (CC) and incremental redundancy (IR).

The chase combining is also referred to as a soft combination. In a CC-type retransmission process, the transmit end may retransmit a coded bit that is the same as a previously incorrectly transmitted pre-transmission coded bit, and the retransmitted coded bit includes an information bit and a check bit. The receive end combines the retransmitted coded bit with the previously received pre-transmission coded bit. Herein, an LLR (Log-Likelihood ratio) of the coded bit that is incorrectly transmitted last time is combined with an LLR of the currently received coded bit, and then a combined LLR value is decoded.

In an incremental redundancy retransmission process, the transmit end may retransmit a retransmitted coded bit. The retransmitted coded bit is different from a previously transmitted pre-transmission coded bit. For example, the transmit end retransmits an additional check bit or a newly check bit generated after retransmission. Alternatively, the transmit end retransmits a part of an information bit and the check bit or another part of a coded codeword. The retransmitted coded bit may have different redundant versions. The receive end performs joint decoding on original information and information of the additionally received retransmitted coded bit. A smaller quantity of bits are retransmitted by using HARQ IR. Therefore, the HARQ IR has higher efficiency than HARQ CC. However, complexity of redesigning a coded codebook is higher.

In the wireless communication system, for example, in a cellular communication system supporting the LTE or 5G, the transmit end sends a single data packet, where the single data packet includes only one data sub-packet, and does not aggregate a plurality of data sub-packets. If the data packet is incorrectly sent, incorrectly received, or not successfully received, the transmit end first encodes a to-be-retransmitted data packet, scrambles coded bits, then performs constellation point mapping modulation, up-carrier, and the like on the coded bits after scrambling, and finally sends a data packet to the receive end through a transmit antenna. After receiving a signal, correspondingly, the receive end sequentially performs constellation point demapping and descrambling, and performs combining and decoding or joint decoding on an LLR of each descrambled coded bit and an LLR of each coded bit that is received last time, to obtain an information bit of the data packet.

In a WLAN communication system, the HARQ requires buffer to store data that needs to be combined. Therefore, the HARQ mechanism is not introduced in previous standards such as 802.11a/g/n/ac/ax. In a future WLAN system, for example, the next-generation WLAN system in which the 802.11be standard is applied, due to improvement of hardware performance, the HARQ technology that can improve transmission reliability and efficiency is likely to be selected as one of technologies of a next-generation Wi-Fi standard. Therefore, in embodiments of this application, the HARQ mechanism is introduced into the WLAN system, and adaptive design is performed, to improve transmission reliability and efficiency of the WLAN system.

The solutions in the embodiments of this application are applicable to a plurality of wireless local area network systems such as the institute of electrical and electronics engineers (IEEE) 11 series protocols. The 11 series protocols include, for example, a next-generation protocol (the 802.11be protocol) of the IEEE 802.11ax protocol, or an advanced next-generation protocol.

Solutions in embodiments of this application may be applied to communication between the transmit end and the receive end in the foregoing communication system. The transmit end and the receive end each may be a wireless communication apparatus that supports wireless communication or a chip, for example, may be an access point and a station that support the WLAN communication system, or a chip in an access point and a chip in a station. For example, a terminal and the station may also be referred to as user terminals, user apparatuses, access apparatuses, subscriber stations, subscriber units, mobile stations, user agents, user devices, or other devices. The user terminals may include various handheld devices, vehicle-mounted devices, wearable devices, computing devices that have a wireless communication function or another processing device connected to a wireless modem; and include various forms of user equipment (UE), mobile stations (MS), terminals, terminal equipment, portable communication devices, handheld devices, portable computing devices, entertainment devices, game devices or systems, global positioning system devices, or any other suitable devices configured to perform network communication by using a wireless media. In addition, the base station or the access point may include various forms of macro base stations, micro base stations, relay stations, wireless access points, and the like.

The WLAN system may include a plurality of basic service sets (BSSs). A basic service set shown in FIG. 1 includes an access point (AP) station and non-access point stations (Non-AP STAs). The access point station is usually briefly referred to as an access point, namely, an AP; and the non-access point station is usually briefly referred to as a station, namely, a STA. Each basic service set may include one AP and a plurality of STAs associated with the AP. The access point is an apparatus having a wireless transceiver function, and may provide a service for the station. The station is an apparatus having a wireless transceiver function, and may access a wireless local area network based on the access point. Therefore, in this application scenario, a transmit end may be the access point or the station, and a receive end may also be the access point or the station. In other words, the method in the embodiments of this application may be applied to communication between access points, communication between the access point and the station, and communication between stations.

In a WLAN, data, control signaling, management signaling, or the like are transmitted between the AP and the STA by using a media access control (MAC) protocol data unit (MPDU). An MPDU generally includes a frame header, a frame body, and a frame check sequence (FCS). The frame body is used to carry data, management information, or control information transmitted from an upper layer. For some specific types of MPDUs, for example, an acknowledgment frame, the frame body may not exist. The FCS is used to check whether the MPDU is correctly transmitted. Optionally, the frame header (which is also referred to as a MAC header) may include at least one of a frame control field, a duration/identifier (Duration/ID) field, an address information field, a sequence control field, a quality of service control (QoS Control) field, and a high throughput control (HT Control) field. In an example, for explanation of each field, refer to the IEEE 802.11 protocol. In the 802.11be protocol, another field may be added to the MAC header or new meanings may be assigned to some fields in the existing MAC header.

Figure 2:
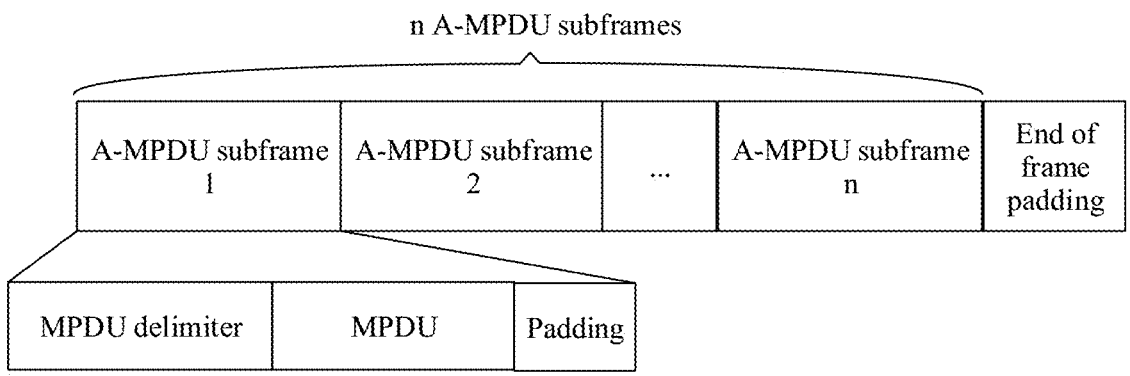
FIG. 2 is a schematic diagram of a frame structure of an A-MPDU according to an embodiment of this application.

To improve WLAN performance, currently, a frame aggregation technology is used at a MAC layer to aggregate a plurality of MPDUs into one aggregated MPDU (A-MPDU). The A-MPDU aggregates the plurality of MPDUs and is sent by using a unified physical layer preamble. This effectively reduces overheads introduced by channel contention and physical layer preambles and improves transmission efficiency. FIG. 2 is a schematic diagram of a structure of an A-MPDU in the IEEE 802.11 standard. As shown in FIG. 2, the A-MPDU includes n A-MPDU subframes, where n is an integer greater than or equal to 1. Optionally, as shown in FIG. 2, the A-MPDU may further include an end of frame (EOF) padding (pad) field located after the n A-MPDU subframes. Each A-MPDU subframe includes an MPDU delimiter and an MPDU. Optionally, the A-MPDU subframe may further include a padding field. The MPDU delimiter is used to separate a plurality of aggregated MPDUs. The n A-MPDU subframes before the end of frame padding field are referred to as A-MPDU pre-EOF padding.

Figure 3:
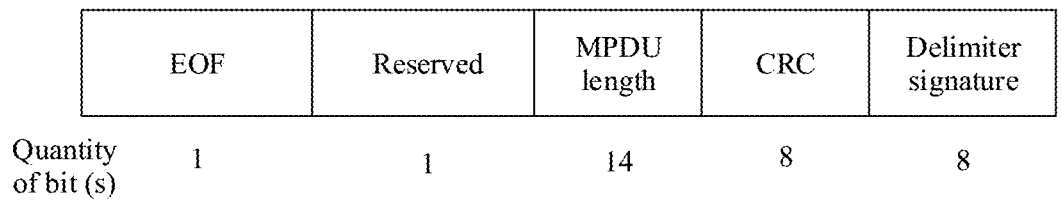
FIG. 3 is a schematic diagram of a structure of an MPDU delimiter according to an embodiment of this application.

Optionally, the MPDU delimiter includes at least one of the following fields: an EOF field, a reserved field, an MPDU length field, a cyclic redundancy code (CRC) field, and a delimiter signature field. Content included in the MPDU delimiter and a sequence of the fields are not limited in this embodiment of this application. FIG. 3 is a schematic diagram of a structure of an MPDU delimiter.

Figure 4:
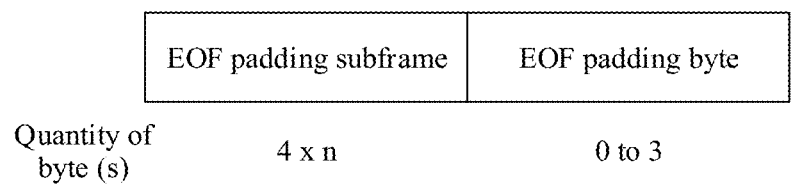
FIG. 4 is a schematic flowchart of an end of frame padding field according to an embodiment of this application.

In the 802.11ax protocol, specifically, an A-MPDU subframe whose EOF field is set to 1 and whose MPDU length field is set to 0 is used to indicate that padding after A-MPDU pre-EOF padding, and is referred to as an EOF padding subframe, where the EOF padding subframe is included in an end of frame padding field. Optionally, the end of frame padding field includes at least one of the EOF padding subframe and an EOF padding byte. FIG. 4 shows a schematic diagram of a structure of an end of frame padding field. As shown in FIG. 4, n is a non-negative integer. That an A-MPDU subframe whose EOF field is set to 1 and whose MPDU length field is set to a non-zero value includes two cases. In one case, the A-MPDU subframe is included in a multi-traffic ID A-MPDU (Multi-TID A-MPDU) or a single-traffic ID A-MPDU (single-TID A-MPDU). A management frame may be considered as a specific data frame that carries a special traffic ID, for example, a traffic ID 15. The A-MPDU subframe is an only A-MPDU subframe of the traffic ID in the multi-TID A-MPDU or the single-TID A-MPDU, is used to solicit a receive end to respond to single acknowledgment information, and may be included in an ACK frame, or may be included in acknowledgment information of multi-station block acknowledgment Multi-STA Block Ack. In another case, the A-MPDU subframe whose EOF field is set to 1 and whose MPDU length field is set to the non-zero value is included in an S-MPDU (or referred to as a VHT single A-MPDU), belongs to a special single MPDU, and is used to solicit the receive end to respond to the single acknowledgment information.

Figure 5:
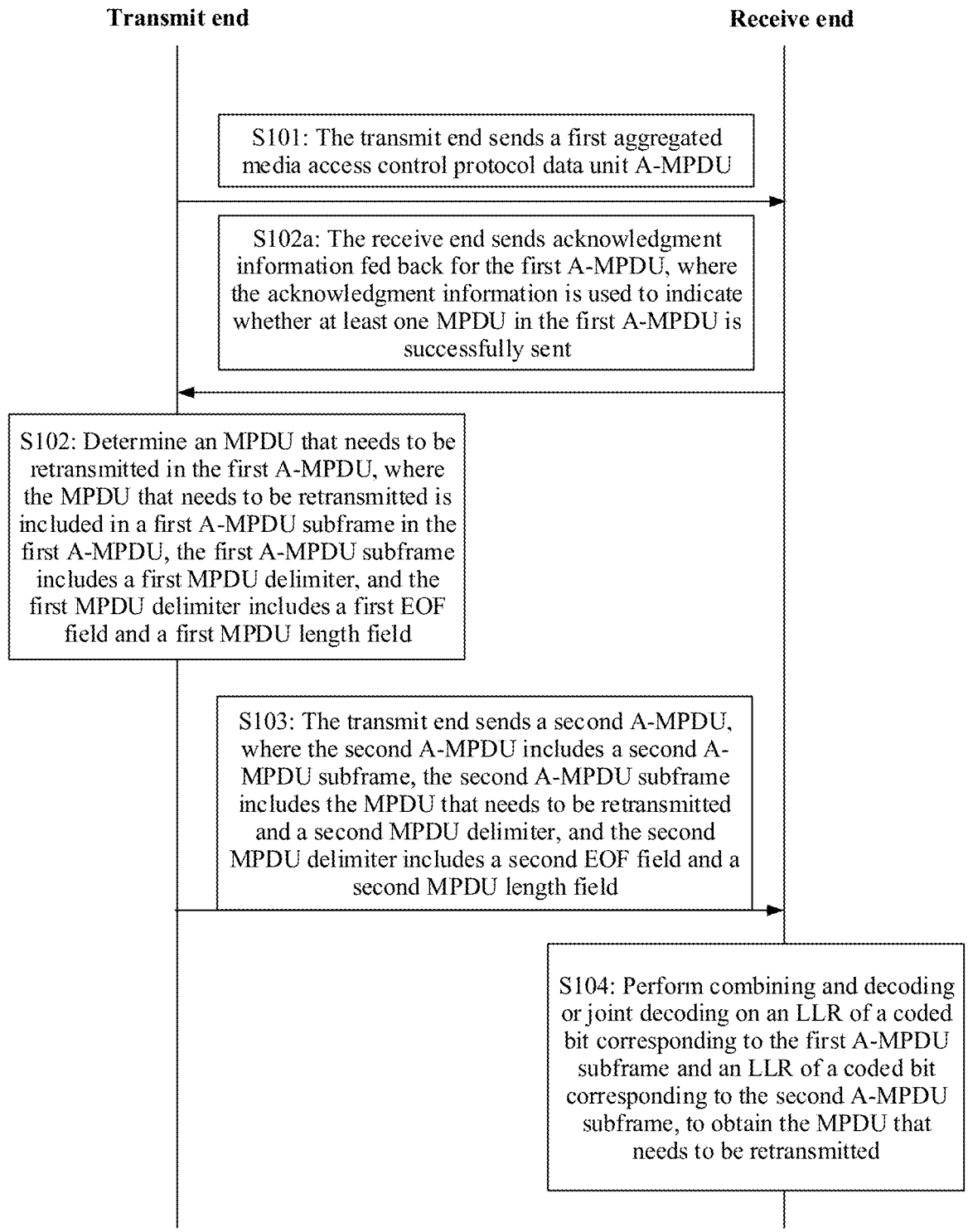
FIG. 5 is a schematic flowchart of an interaction method for a retransmitted MPDU according to an embodiment of this application.

FIG. 5 is a schematic flowchart of a data unit (a medium access control protocol data unit, MPDU) interaction method according to an embodiment of this application. A procedure of the interaction method includes the following steps.

S101: A transmit end sends a first aggregated media access control protocol data unit A-MPDU.

The first A-MPDU includes at least one A-MPDU subframe.

One A-MPDU subframe includes one MPDU. Therefore, each of the at least one A-MPDU subframe includes one MPDU. For example, a quantity of the at least one A-MPDU subframe is M, and M is a positive integer. One A-MPDU subframe includes one MPDU. Therefore, the M A-MPDU subframes include M MPDUs. One A-MPDU subframe further includes an MPDU delimiter and a padding field. Optionally, for a structure of the MPDU delimiter, refer to FIG. 3. The first A-MPDU may further include an end of frame padding field located after the at least one A-MPDU subframe. Optionally, for a structure of the end of frame padding field, refer to FIG. 4.

Further, the transmit end may encapsulate the first A-MPDU into a first physical layer protocol data unit PPDU (PPDU) and send the first A-MPDU to a receive end. During encapsulation, physical layer bits such as pre-FEC padding and/or tail bits padding may be padded as required after the first A-MPDU. An encoding method and encoding parameters that are used to encode the first A-MPDU in an encapsulation process are not limited in this implementation of this application. For example, a low density parity code (LDPC) and a binary convolutional code (BCC) may be used for encoding. The encoding parameters used in step S101 may be referred to as pre-transmission encoding parameters.

S102: Determine an MPDU that needs to be retransmitted in the first A-MPDU, where the MPDU that needs to be retransmitted is included in a first A-MPDU subframe in the first A-MPDU, the first A-MPDU subframe includes a first MPDU delimiter, and the first MPDU delimiter includes a first EOF field and a first MPDU length field.

The transmit end determines the MPDU that needs to be retransmitted in the first A-MPDU, where the MPDU that needs to be retransmitted is included in the first A-MPDU subframe of the first A-MPDU. There may be one or more MPDUs that need to be retransmitted. It may be understood that if there are N MPDUs that need to be retransmitted, the N MPDUs that need to be retransmitted are separately included in N first A-MPDU subframes in the first A-MPDU. Optionally, the first A-MPDU may further include another A-MPDU subframe. Optionally, an MPDU in the another A-MPDU subframe does not need to be retransmitted.

The transmit end may determine, in a plurality of manners, which MPDUs in a previously transmitted A-MPDU need to be retransmitted. For example, the transmit end may determine which previously transmitted MPDUs need to be retransmitted based on acknowledgment information sent by the receive end, or based on service requirements of the transmit end, or based on acknowledgment information sent by the receive end and an actual situation of the transmit end.

In one manner, the transmit end determines, based on the acknowledgment information fed back by the receive end, which MPDUs need to be retransmitted. Therefore, optionally, the acknowledgment information fed back by the receive end is used to indicate, to the transmit end, which MPDUs in the previously transmitted A-MPDU are successfully received. For example, the receive end may use negative acknowledgment (NACK) information, or a bitmap in a block acknowledgment (Block Ack) frame, or a bitmap in a multi-STA block acknowledgment (Multi-STA Block Ack) frame to inform the transmit end of specific MPDUs that fail to be received or are successfully received.

Optionally, the MPDU that needs to be retransmitted may be an MPDU that is unsuccessfully received (that fails to be received) by the receive end in previous transmission. An MPDU that does not need to be retransmitted may be an MPDU that is successfully received (that succeeds to be received) by the receive end in the previous transmission, or an MPDU that is not correctly received and that does not need to be retransmitted again, for example, an MPDU whose actual effect time period ends.

Optionally, before step S102, the method includes S102a: The receive end sends acknowledgment information fed back for the first A-MPDU, where the acknowledgment information is used to indicate whether the at least one MPDU in the first A-MPDU is successfully sent. Optionally, the acknowledgment information may be acknowledgment (ACK) or block acknowledgment (BA).

Correspondingly, the receive end receives the acknowledgment information. The transmit end determines, based on the acknowledgment information, which MPDUs in the first A-MPDU fail to be sent, to determine the MPDUs that need to be retransmitted. For example, N MPDUs in the M MPDUs of the first A-MPDU fail to be sent, where N is an integer greater than or equal to 1 and less than or equal to M. In this case, the transmit end determines that the N MPDUs need to be retransmitted.

In step S102, after determining the MPDUs that need to be retransmitted, the transmit end retransmits the MPDUs in a second A-MPDU.

S103: The transmit end sends the second A-MPDU, where the second A-MPDU includes a second A-MPDU subframe, the second A-MPDU subframe includes the MPDU that needs to be retransmitted and a second MPDU delimiter, and the second MPDU delimiter includes a second EOF field and a second MPDU length field.

A value of the second EOF field is the same as a value of the first EOF field, and a value of the second MPDU length field is the same as a value of the second MPDU length field.

There may be one or more MPDUs that need to be retransmitted in the first A-MPDU. If there are a plurality of MPDUs that need to be retransmitted, for example, N MPDUs need to be retransmitted. In this case, the N MPDUs are separately included in N second A-MPDU subframes of the second A-MPDU. One second A-MPDU includes one MPDU that needs to be retransmitted. Optionally, the second A-MPDU may further include another A-MPDU subframe. Each subframe in the second A-MPDU may further include an MPDU delimiter and a padding field. Optionally, for a structure of the MPDU delimiter, refer to FIG. 3; and for a structure of the padding field, refer to FIG. 4.

Optionally, the second MPDU delimiter is the same as the first MPDU delimiter, in other words, a value of any field in the second MPDU delimiter is the same as a value of a corresponding field in the first MPDU delimiter.

Optionally, in the second A-MPDU, the retransmitted MPDU includes a MAC header, and values of fields in the MAC header also needs to be set to be the same as values of fields in a MAC header of the MPDU in the first A-MPDU.

Optionally, if the MPDU is encrypted, the MPDU may further include an encryption header field, and a value of the encryption header field when the MPDU is retransmitted also needs to be the same as a value of the encryption header field when the MPDU is previously transmitted. The encryption header field is located after the MAC header field. There are a plurality of encryption methods. For example, encryption is performed by using a cipher-block chaining message authentication code (CBC-MAC) protocol (CBC-MAC protocol, CCMP), the encryption header is a CCMP header, and the MPDU may be referred to as a CCMP MPDU, where the CCMP MPDU further includes a message integrity code (MIC) field, the CCMP header includes 8 bytes, and the MIC field includes 16 bytes. The CCMP header field includes a packet number (PN), an extended initialization vectors (ExtIV) indication, and a key ID subfield. For another example, if encryption is performed by using a Galois/counter mode (GCM) protocol (GCM protocol, GCMP), the encryption header is a GCMP header, and the MPDU may be referred to as a GCMP MPDU, where the GCMP MPDU further includes a MIC field, the GCMP header includes 8 bytes, and the MIC field includes 16 bytes. The GCMP header includes a PN, an extended initialization vectors (ExtIV) indication, and a key ID subfield. In the GCMP header, the ExtIV indication keeps being set to 1.

Optionally, the first A-MPDU subframe includes a first padding field, the second A-MPDU subframe includes a second padding field, and a value of the first padding field is the same as a value of the second padding field. Optionally, a value of a retry (retry) bit in a frame header of the MPDU that needs to be retransmitted in the second A-MPDU is the same as a value of a retry bit in a MAC header of the MPDU that needs to be retransmitted in the first A-MPDU. Optionally, in the second A-MPDU, the value of the retry bit in the MAC header of the MPDU that needs to be retransmitted is set to 0. Optionally, a value of a buffered traffic size field in the MAC header of the MPDU that needs to be retransmitted in the second A-MPDU is the same as a value of a buffered traffic size field in the MAC header of the MPDU that needs to be retransmitted in the first A-MPDU. Optionally, the retry bit is included in a frame control field of the MAC header, and the buffered traffic size field may be included in an HT-Control field (referred to as an A-control field in the 802.11ax) or a QoS control field of the MAC header.

Further, the transmit end may encapsulate the second A-MPDU into a second physical layer protocol data unit PPDU, and send the second A-MPDU to the receive end. Parameters used to encode the second A-MPDU in step S103 are referred to as retransmission encoding parameters. To facilitate combining and decoding or joint decoding performed by the receive end, the encoding method and encoding parameters used for encoding the second A-MPDU are the same as or have a preset relationship with the encoding method and the encoding parameters used for encoding the first A-MPDU.

Optionally, the encoding parameters (the retransmission encoding parameter and the pre-transmission encoding parameter) include a bit rate and a generator polynomial matrix corresponding to the bit rate. Optionally, the encoding parameters further include a puncturing pattern. In an example, that the retransmission encoding parameter is the same as the pre-transmission encoding parameter may mean that the bit rate and the generator polynomial matrix corresponding to the bit rate are the same. Optionally, if the encoding parameter includes the puncturing pattern, a retransmission puncturing pattern and a pre-transmission puncturing pattern are also the same. In an example, that the retransmission encoding parameter has the preset relationship with the pre-transmission encoding parameter means that the bit rate, and the generator polynomial matrix corresponding to the bit rate are the same. If the encoding parameter includes the puncturing pattern, the retransmission puncturing pattern has a preset relationship with the pre-transmission puncturing pattern. A coded bit obtained in the retransmission puncturing pattern and a coded bit obtained in the pre-transmission puncturing pattern may be combined into a coded bit obtained in a new puncturing pattern.

The following uses BCC encoding and LDPC encoding as an example for description.

Optionally, during retransmission, performing the LDPC encoding on the second A-MPDU subframe includes but is not limited to the following two manners:

(1) For HARQ CC, a correctly received information bit in an LDPC codeword corresponding to a to-be-retransmitted MPDU or consecutively to-be-retransmitted MPDUs is punctured, in other words, the correctly received information bit is deleted. It should be noted that, how to obtain the LDPC codeword corresponding to the to-be-retransmitted MPDU or the consecutively to-be-retransmitted MPDUs is not limited in this application. The LDPC codeword may be previously stored, or may be regenerated through LDPC encoding based on a same parameter used for the to-be-retransmitted MPDU.

(2) For HARQ IR, a new check bit generated by the information bit included in the LDPC codeword corresponding to the to-be-retransmitted MPDU or the consecutively to-be-retransmitted MPDUs and the corresponding information bit are combined to form a new LDPC codeword. Generally, an information bit set (including a quantity of bits and corresponding bits) included in the new LDPC codeword is the same as an information bit set included in an LDPC codeword incorrectly transmitted last time. In other words, an initially transmitted LDPC codeword and a retransmitted LDPC codeword are generated by using a same mother LDPC codebook, to be specific, information bits included in the initially transmitted LDPC codeword and information bits included in the retransmitted LDPC codeword are the same. Check bits are different subsets of check bits of the mother LDPC codeword (the different subsets may overlap).

It should be noted that regardless that the BCC encoding or the LDPC encoding is used, bits included in the second A-MPDU subframe are encoded as information bits. Certainly, during encoding, puncturing may be performed, and information bits may be punctured, or check bits may be punctured.

Optionally, during retransmission, performing the BCC encoding on the second A-MPDU subframe includes but is not limited to the following two manners:

(1) For the HARQ CC, the BCC encoding is performed on retransmission encoding parameters (including a bit rate, a generator polynomial matrix corresponding to the bit rate, and an optional puncturing pattern) used for a single to-be-retransmitted MPDU or a second A-MPDU subframe corresponding to at least two consecutively to-be-retransmitted MPDUs. The retransmission encoding parameter is the same as or has the preset relationship with the pre-transmission encoding parameter. Optionally, bit rates used for retransmission and pre-transmission are the same, and generator polynomial matrices corresponding to the bit rates are the same. Optionally, puncturing patterns used for the retransmission and the pre-transmission are also the same.

BCC encoding parameters (for example, the retransmission encoding parameter and the pre-transmission encoding parameter) include a bit rate and a generator polynomial matrix. Optionally, the BCC encoding parameters further include a puncturing pattern. Generally, for a standard protocol of an application product, one bit rate corresponds to one generator polynomial matrix, and the BCC encoding parameters further optionally includes a puncturing pattern. In academic discussion, each bit rate may correspond to different generator polynomial matrices and puncturing patterns.

(2) For the HARQ IR, BCC encoding with the same parameters, including the bit rate and the corresponding generator matrix, is performed on the single to-be-retransmitted MPDU or the second A-MPDU subframe corresponding to the at least two consecutively to-be-retransmitted MPDUs. Then, the coded bit is periodically punctured in another puncturing pattern different from the puncturing pattern-transmission, to generate a punctured coded bit. The puncturing pattern used in retransmission is different from the puncturing pattern used in pre-transmission, and the two puncturing patterns has a preset relationship. The coded bit generated in the puncturing pattern used in retransmission and the coded bit generated in the puncturing pattern used in pre-retransmission may be considered as a coded bit generated in another new puncturing pattern or a coded bit generated without a puncturing operation. Therefore, that the retransmission encoding parameter has the preset relationship with the pre-transmission encoding parameter means that the bit rates, and the generator polynomial matrices corresponding to the bit rates used for retransmission and pre-transmission are the same, and the puncturing pattern used in retransmission and the puncturing pattern used in pre-transmission has the preset relationship.

To support a HARQ mechanism, it is proposed in this embodiment of this application that content of a retransmitted MPDU needs to be the same as content of a previously transmitted MPDU. In addition, values of an MPDU delimiter and a padding field included in an A-MPDU subframe in which the retransmitted MPDU is located also need to be the same as values of an MPDU delimiter and a padding field of the previously transmitted MPDU, where a value of an EOF included in the MPDU delimiter field is the same as a value of an MPDU length subfield included in the MPDU delimiter field.

S104: Perform combining and decoding or joint decoding on a log-likelihood ratio LLR of a coded bit corresponding to the first A-MPDU subframe and an LLR of a coded bit corresponding to the second A-MPDU subframe, to obtain the MPDU that needs to be retransmitted.

The receive end performs combining and decoding or joint decoding on the LLR of the coded bit corresponding to the second A-MPDU subframe in the second A-MPDU and the LLR of the coded bit of the first A-MPDU subframe in the first A-MPDU, to obtain information bits of the A-MPDU subframes, so as to obtain the MPDU that needs to be retransmitted. In this way, the MPDU that is previously incorrectly transmitted is successfully received, to improve transmission reliability.

In an implementation, the LDPC encoding is used, and for the HARQ CC, the receive end performs combining and decoding on an LLR of an LDPC codeword corresponding to the second A-MPDU subframe and an LLR of an LDPC codeword corresponding to the first A-MPDU subframe. For the HARQ IR, the receive end performs joint decoding on the LLR of the LDPC codeword corresponding to the second A-MPDU subframe and the LLR of the LDPC codeword corresponding to the first A-MPDU subframe.

In another implementation, the BCC encoding is used, and for the HARQ CC, the receive end performs combining and decoding on an LLR of a BCC coded bit corresponding to the second A-MPDU subframe and an LLR of a BCC coded bit corresponding to the first A-MPDU subframe. For the HARQ IR, the receive end performs joint decoding on the LLR of the BCC coded bit corresponding to the second A-MPDU subframe and the LLR of the BCC coded bit corresponding to the first A-MPDU subframe.

In a case, if the at least one MPDU included in the first A-MPDU each is the MPDU that needs to be retransmitted, in other words, the transmit end needs to retransmit all MPDUs in the first A-MPDU. The second A-MPDU further includes a second end of frame padding field located after all second A-MPDU subframes, the first A-MPDU further includes a first end of frame padding field located after the first A-MPDU subframe, and a value of the second end of frame padding field is the same as a value of the first end of frame padding field. When the transmit end needs to retransmit all MPDUs in the first A-MPDU, optionally, a value of a physical layer padding bit padded after the second A-MPDU also needs to be the same as a value of a physical layer padding bit padded after the first A-MPDU last time. For example, the first PPDU carrying the first A-MPDU subframe may further include first pre-FEC padding located after the first A-MPDU, and the second PPDU carrying the second A-MPDU subframe may include second pre-FEC padding located after the second A-MPDU, where the first pre-FEC padding is the same as the second pre-FEC padding. For example, the first PPDU may further include a first tail bit located after the first A-MPDU, and the second PPDU may further include a second tail bit located after the second A-MPDU, where a value of the second tail bit is the same as a value of the first tail bit.

In this embodiment of this application, during retransmission, the transmit end sets values of related fields in the A-MPDU subframe that includes the retransmitted MPDU to be the same as values of related fields in the A-MPDU subframe that includes the previously transmitted MPDU, so that the information bits are the same. In this way, the receive end can perform combining and decoding or joint decoding on an LLR of the coded bit of the previously transmitted A-MPDU subframe and an LLR of the coded bit of the currently retransmitted A-MPDU subframe, to improve transmission reliability and efficiency. Otherwise, because the information bits are different, combining and decoding or joint decoding cannot be performed on LLRs of coded bits of previously and currently transmitted A-MPDU subframes that include a same MPDU. The solutions in this embodiment of this application implement a HARQ mechanism applicable to a structure of an A-MPDU in a WLAN system.

Figure 6A:
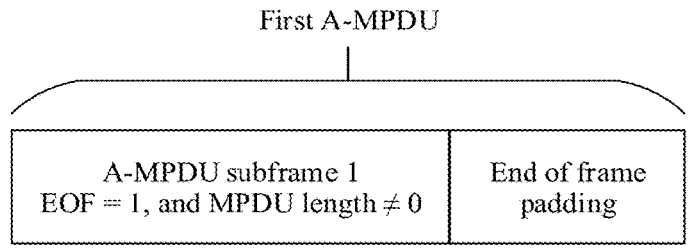
FIG. 6a is a schematic diagram of a structure of a first A-MPDU according to an embodiment of this application.
Figure 6B:
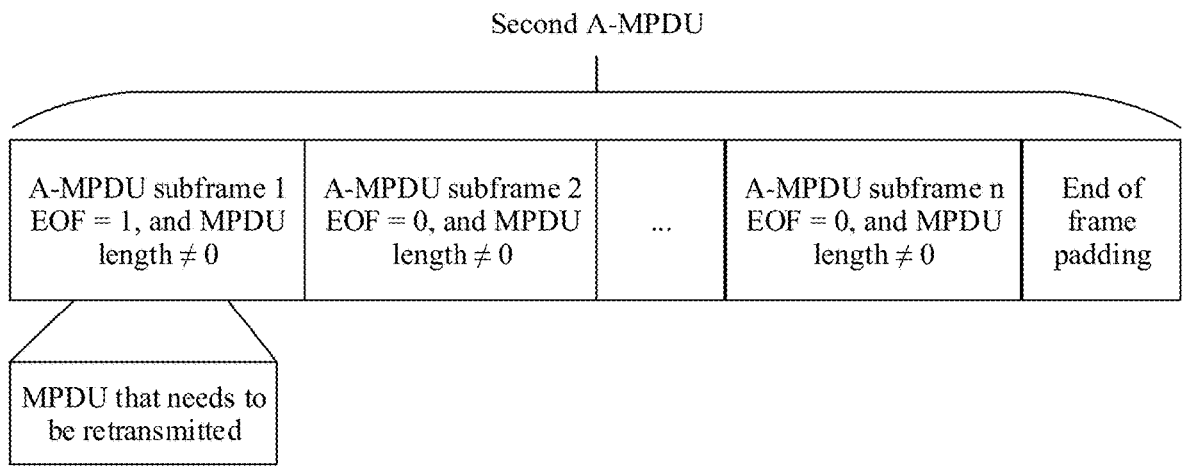
FIG. 6b is a schematic diagram of a structure of a second A-MPDU according to an embodiment of this application.

FIG. 6a is a schematic diagram of a structure of a first A-MPDU, and FIG. 6b is a schematic diagram of a structure of a second A-MPDU.

With reference to FIG. 6a and FIG. 6b, a transmit end sends a single-traffic ID S-MPDU (a first A-MPDU shown in FIG. 6a) on a channel, where the S-MPDU includes an A-MPDU subframe 1. However, an MPDU in the A-MPDU subframe 1 fails to be transmitted. During retransmission, the MPDU is aggregated with other MPDUs of the same traffic ID (a second A-MPDU shown in FIG. 6b) for sending. It should be noted that if an EOF of the A-MPDU subframe 1 in the second A-MPDU subframe is set by using the existing 802.11ax protocol, the EOF needs to be set to 0. To support a HARQ mechanism, in this example, setting of the EOF of an MPDU delimiter of the A-MPDU subframe 1 in the second A-MPDU does not comply with setting of the 802.11ax protocol and a previous protocol, and a value of the EOF in the A-MPDU subframe 1 of the second A-MPDU is set to be the same as a value of an EOF in the A-MPDU subframe 1 of the first A-MPDU. In addition, a value of an MPDU length field in the MPDU delimiter of the A-MPDU subframe 1 in the second A-MPDU also needs to be the same as a value of an MPDU length field in an MPDU delimiter of the A-MPDU subframe 1 in the first A-MPDU. Reasons are as follows: Content of an MPDU included in a retransmitted A-MPDU subframe may be a part of a previously MPDU that fails to be transmitted. For example, in HARC CC transmission, different previously designed redundant versions of MPDUs are transmitted in each time of retransmission. During retransmission, a value of a padding field in the A-MPDU subframe 1 also needs to be the same as a value of a padding field in an A-MPDU subframe 1 that is incorrectly transmitted last time.

Figure 7A:
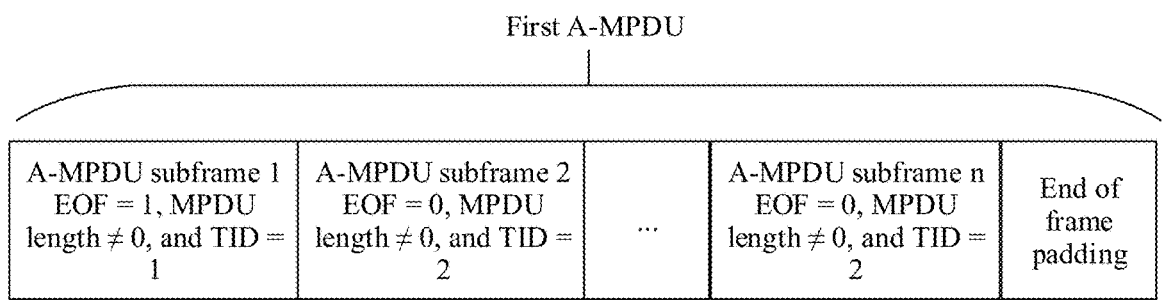
FIG. 7a is a schematic diagram of a structure of another first A-MPDU according to an embodiment of this application.
Figure 7B:
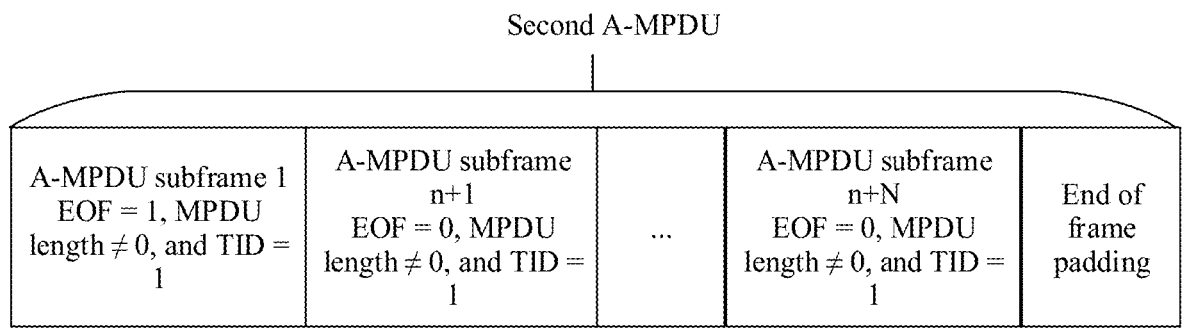
FIG. 7b is a schematic diagram of a structure of another second A-MPDU according to an embodiment of this application.

FIG. 7a is a schematic diagram of a structure of another first A-MPDU, and FIG. 7b is a schematic diagram of a structure of another second A-MPDU.

With reference to FIG. 7a and FIG. 7b, a transmit end sends a multiple traffic ID aggregated media access control data unit multi-TID A-MPDU (multiple traffic ID A-MPDU, multi-TID A-MPDU) on a channel, where traffic IDs include a TID 1 and a TID 2. The multi-TID A-MPDU (a first A-MPDU) is shown as an example in the following FIG. 7a. It is learned, based on acknowledgment information fed back by a receive end, that an A-MPDU subframe 1 in a first A-MPDU fails, and is aggregated with another MPDU whose traffic ID is the TID 1 for sending during next retransmission. The second A-MPDU is shown as an example in the FIG. 7b. It should be noted that, setting of an EOF of an MPDU delimiter of the A-MPDU subframe 1 in the second A-MPDU does not meet setting of the 802.11ax and a previous protocol, but in order to support HARQ transmission, a value of the EOF in the A-MPDU subframe 1 of the second A-MPDU is set to be the same as a value of an EOF in the A-MPDU subframe 1 of the first A-MPDU. In addition, a value of an MPDU length field in the MPDU delimiter of the A-MPDU subframe 1 in the second A-MPDU also needs to be the same as a value of an MPDU length field in an MPDU delimiter of the A-MPDU subframe 1 in the first A-MPDU. Reasons are as follows: Content of an MPDU included in a retransmitted A-MPDU subframe may be a part of a previously MPDU that fails to be transmitted. For example, in HARC CC transmission, different previously designed redundant versions of MPDUs are transmitted in each time of retransmission. During retransmission, a value of a padding field in the A-MPDU subframe 1 also needs to be the same as a value of a padding field in an A-MPDU subframe 1 that is incorrectly transmitted last time.

FIG. 6a, FIG. 6b, FIG. 7a, and FIG. 7b show cases in which only one MPDU is retransmitted. Certainly, the solutions in the embodiments of this application may also be applicable to a case in which a plurality of MPDUs are retransmitted. This is not limited to the examples of FIG. 6a, FIG. 6b, FIG. 7a, and FIG. 7b.

Figure 8A:
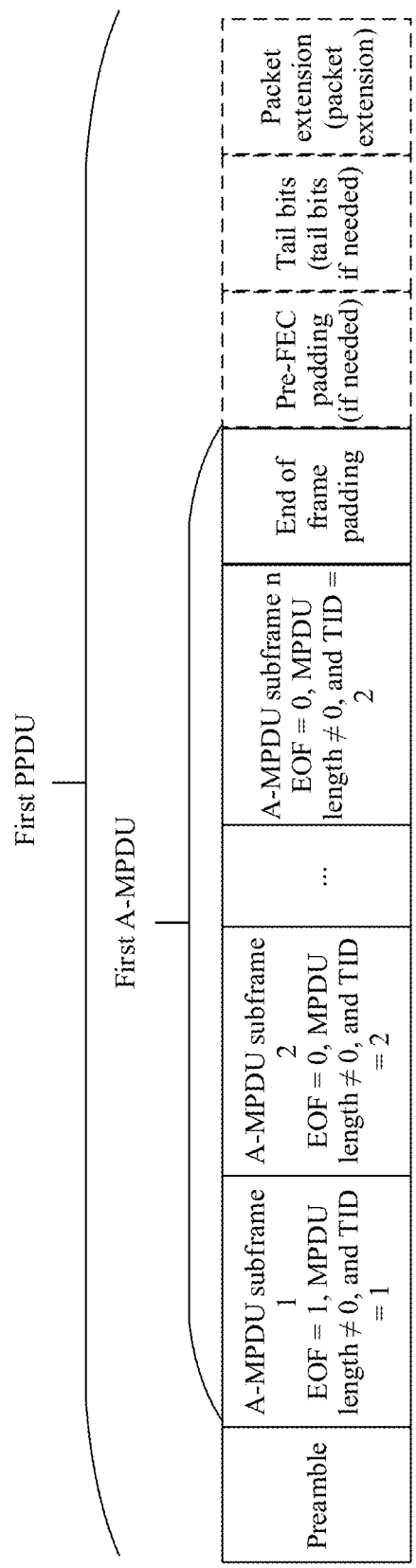
FIG. 8a is a schematic diagram of a structure of a first PPDU according to an embodiment of this application.
Figure 8B:
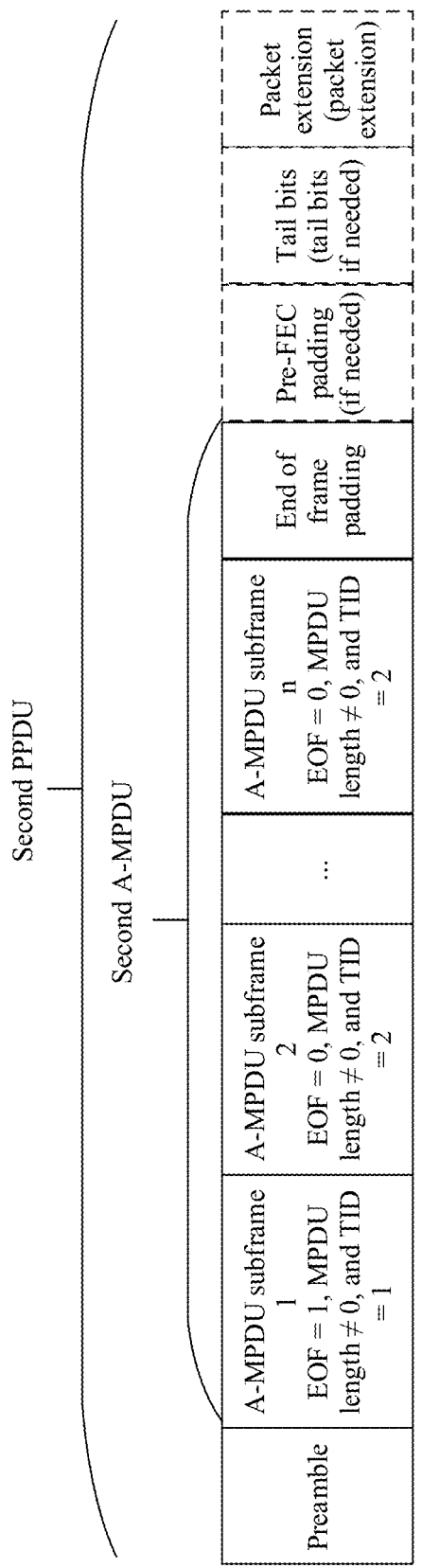
FIG. 8b is a schematic diagram of a structure of a second PPDU according to an embodiment of this application.

FIG. 8a is a schematic diagram of a first PPDU, and FIG. 8b is a schematic diagram of a second PPDU.

If an entire first A-MPDU is retransmitted, a second A-MPDU includes all MPDUs in the first A-MPDU. A value of an end of frame padding field of the second A-MPDU also needs to be the same as a value of an end of frame padding field of the first A-MPDU. Optionally, a value of a physical layer padding bit that may be included after the second A-MPDU may also need to be the same as a value of a physical layer padding bit included after the first A-MPDU. In the 802.11ax or a previous protocol, the value of the physical layer padding bit is not specified, to avoid a problem in which combining and decoding or joint decoding cannot be performed that may be caused in HARQ transmission. Therefore, in this application, the value of the physical layer padding bit that may be included after the second A-MPDU also needs to be the same as the value of the physical layer padding bit included after the first A-MPDU.

In the 802.11ax protocol, to have more processing time for a receive end, after the A-MPDU, the first PPDU may include pre-FEC padding and/or packet extension. Duration of the pre-FEC padding may be a quarter (¼) of OFDM symbol duration, a half (½) of OFDM symbol duration, or three-quarters (¾) of OFDM symbol duration; and duration of the packet extension may be 4 μs, 8 μs, or 16 μs. Optionally, during retransmission, a value of a pre-FEC padding field included in the second PPDU also needs to be set to be the same as a value of the pre-FEC padding in the first PPDU.

Certainly, in a scenario of retransmitting the entire A-MPDU shown in FIG. 8a and FIG. 8b, a value of an EOF and a value of an MPDU length field of an A-MPDU subframe to which each retransmitted MPDU belongs also need to be set to be the same as those before. For specific setting, refer to descriptions of the foregoing embodiments.

In addition, regardless that some MPDUs in the first A-MPDU are retransmitted or all MPDUs are retransmitted, for each MPDU that needs to be retransmitted, if reference is made to the 802.11ax or the previous protocol, control information carried in a MAC header of a previously transmitted MPDU and control information carried in a MAC header of a subsequently retransmitted MPDU may be set differently. For example, for setting of values of retry bits of frame control fields in the MAC headers, during previous transmission, the value of the retry bit is set to 0, and during retransmission, the value of the retry bit is set to 1. A buffered traffic size field carried in an HT-control field (referred to as an A-control field in the 802.11ax) or a QoS control field in the MAC header is further used as an example. During previous transmission, the buffered traffic size field indicated by the HT-control field in the MAC header (referred to as the A-control field in the 802.11ax) or the QoS control field may be X bytes; but during retransmission, the buffered traffic size field indicated by the HT-control field (referred to as the A-control field in the 802.11ax) or the QoS control field in the MAC header may be Y bytes. In this application, regardless that some MPDUs in the first A-MPDU are retransmitted or all MPDUs are retransmitted, for each MPDU that needs to be retransmitted, when any MPDU is retransmitted, content of the MAC header of the retransmitted MPDU needs to remain the same as content carried in the MAC header of the MPDU incorrectly transmitted last time, including the value of the retry bit of the frame control field, and the buffered traffic size field carried in the HT-control field (referred to as the A-control field in the 802.11ax) or the QoS control field. Therefore, to be specific, if reference is made to the 802.11ax or the previous protocol, when the MPDU is retransmitted, values of some fields may be set to be different from values of the fields when the MPDU is previously transmitted. In this embodiment of this application, the fields need to be set to have the same values, to ensure that a value of a retransmitted information bit is the same as a value of a previously transmitted information bit, and to ensure that the receive end can implement joint decoding or combining and decoding, to implement the HARQ mechanism.

Figure 9:
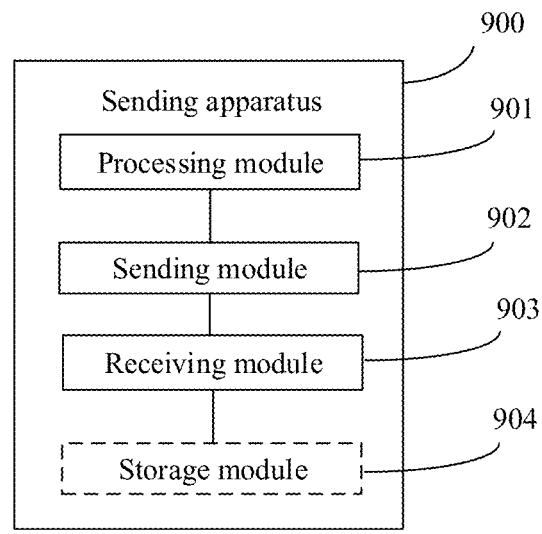
FIG. 9 is a schematic diagram of a structure of a sending apparatus according to an embodiment of this application.

FIG. 9 is a schematic diagram of a structure of a sending apparatus according to an embodiment of this application, where the sending apparatus may be applied to a transmit end or a chip in a transmit end. The sending apparatus 900 includes a processing module 901, a sending module 902, and a receiving module 903.

In an implementation, the sending apparatus may be configured to perform any function of the foregoing transmit end, and the following is used as examples.

The processing module 901 is configured to determine an MPDU that needs to be retransmitted in a first A-MPDU. For example, the processing module 901 is configured to perform the foregoing S102, or the processing module 901 is further configured to encode the first A-MPDU, or the processing module 901 is further configured to encode a second A-MPDU. The sending module 902 is configured to send the first A-MPDU and the second A-MPDU, for example, the sending module 902 is configured to perform S101 and S103. The receiving module 903 is configured to receive acknowledgment feedback information, where the acknowledgment feedback information is used to indicate which MPDUs in the first A-MPDU are not successfully received, for example, the receiving module 903 is configured to perform S102a. Optionally, the sending apparatus 900 further includes a storage module 904, where the storage module 904 is configured to store instructions.

In a possible design, the sending apparatus 900 is the chip in the transmit end, the sending module is an input interface, the receiving module is an output interface, and the processing module is a processing circuit, where the input interface and the output interface are used to implement signaling or data interaction between the chip and another component. The processing circuit is configured to implement processing on the signaling or data, for example, the processing circuit is configured to send (output) the first A-MPDU and the second A-MPDU, and is configured to receive (input) the acknowledgment information. The processing circuit is configured to determine, based on the acknowledgment information, which MPDUs in the first A-MPDU need to be retransmitted. An apparatus in which the chip is installed may implement the method and functions of the transmit end in the foregoing embodiments.

In this embodiment of this application, the data transmission apparatus shown in FIG. 9 is used as an example to describe modules in a data transmission apparatus used for the transmit end.

Figure 10:
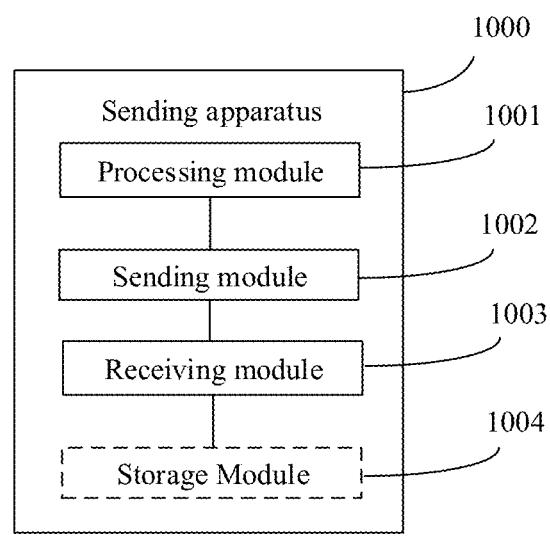
FIG. 10 is a schematic diagram of a structure of a receiving apparatus according to an embodiment of this application.

FIG. 10 is a schematic diagram of a structure of a receiving apparatus according to an embodiment of this application, where the receiving apparatus 1000 may be applied to a receive end or a chip in a receive end. The receiving apparatus 1000 includes a processing module 1001, a sending module 1002, and a receiving module 1003.

In an implementation, the receiving apparatus may be configured to perform any function of the foregoing receive end, and the following is used as examples.

The processing module 1001 is configured to determine which MPDUs in a first A-MPDU are successfully sent. The processing module 1001 is further configured to perform combining and decoding or joint decoding on an LLR of a coded bit of a first A-MPDU subframe and an LLR of a coded bit of a second A-MPDU subframe, to obtain a retransmitted MPDU. For example, the processing module 1001 is configured to perform the foregoing S104. The sending module 1002 is configured to send acknowledgment information, for example, the sending module 1002 is configured to perform S102a, where the acknowledgment feedback is used to indicate which MPDUs in the first A-MPDU are not successfully received. The receiving module 1003 is configured to receive the first A-MPDU and a second A-MPDU, for example, the receiving module 1003 is configured to receive information sent in S102 and S103. Optionally, the receiving apparatus 1000 further includes a storage module 1004, where the storage module 1004 is configured to store an LLR corresponding to a pre-transmission coded bit, and optionally, the storage module 1004 is further configured to store instructions.

In a possible design, the receiving apparatus 1000 is the chip in the receive end, the sending module is an input interface, the receiving module is an output interface, and the processing module is a processing circuit, where the input interface and the output interface are used to implement signaling or data interaction between the chip and another component. The processing circuit is configured to implement processing on the signaling or data, for example, the processing circuit is configured to receive (input) the first A-MPDU and the second A-MPDU, and configured to send (output) the acknowledgment information. The processing circuit is configured to determine, based on the acknowledgment information, which MPDUs in the first A-MPDU are successfully sent and which MPDUs in the first A-MPDU fail to be sent. An apparatus in which the chip is installed may implement the method and functions of the receive end in the foregoing embodiments.

In this embodiment of this application, the data transmission apparatus shown in FIG. 10 is used as an example to describe modules in a data transmission apparatus used for the receive end.

The sending apparatus (used for the transmit end) or the receiving apparatus (used for the receive end) provided in the embodiments of this application may be implemented in a plurality of product forms. For example, the sending apparatus or the receiving apparatus may be configured as a general processing system. For example, the sending apparatus or the receiving apparatus may be implemented by a general bus architecture. For example, the sending apparatus or the receiving apparatus may be implemented by using an application-specific integrated circuit (ASIC). The following provides several possible product forms of the sending apparatus or the receiving apparatus in the embodiments of this application. It should be understood that the following is merely an example, and the possible product forms in the embodiments of this application are not limited thereto.

Figure 11:
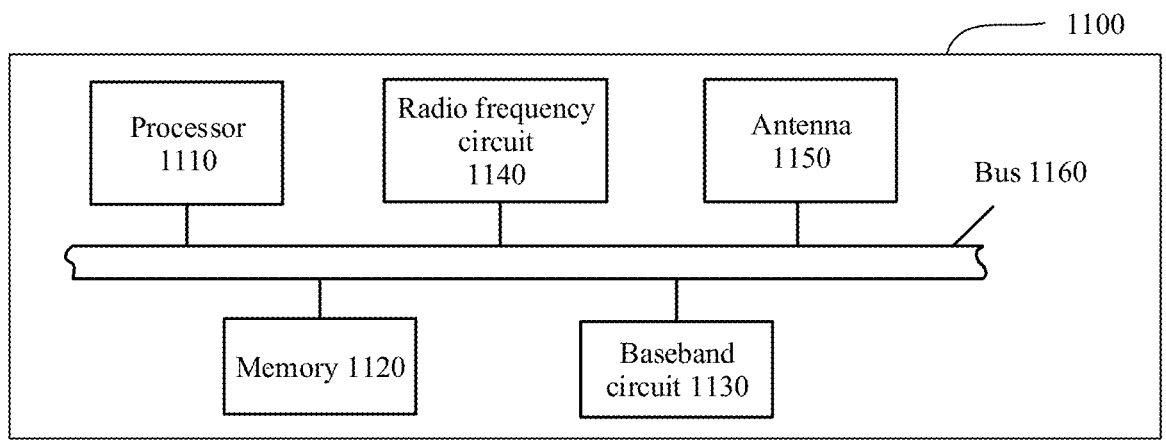
FIG. 11 is a schematic diagram of a structure of another sending apparatus according to an embodiment of this application.

In an example, FIG. 11 is a schematic block diagram of a sending apparatus 1100 according to an embodiment of this application. The apparatus 1100 in this embodiment of this application may be the transmit end in any one of the foregoing method embodiments, or may be one or more chips in the transmit end. The apparatus 1100 may be configured to perform some or all functions of the transmit end in the foregoing method embodiments.

The apparatus 1100 may include a processor 1110, a baseband circuit 1130, a radio frequency circuit 1140, and an antenna 1150. Optionally, the apparatus 1100 may further include a memory 1120. Components of the apparatus 1100 are coupled together through a bus 1160. In addition to a data bus, the bus system 1160 includes a power bus, a control bus, and a status signal bus. However, for clear description, various types of buses in the figure are marked as the bus system 1160.

The processor 1110 may be configured to control the transmit end, and configured to perform processing performed by the transmit end in the foregoing embodiments. The processor 1110 may perform a processing process related to the transmit end in the foregoing method embodiments and/or configured to perform another process of the technology described in this application. Further, the processor 1110 may run an operating system, be responsible for managing the bus, and execute a program or instructions stored in the memory.

The baseband circuit 1130, the radio frequency circuit 1140, and the antenna 1150 may be configured to support information receiving and sending between the transmit end and the receive end in the foregoing embodiments, so as to support wireless communication between the transmit end and the receive end.

In an example, at the transmit end, a first A-MPDU or a second A-MPDU is processed by the processor 1110; and after the first A-MPDU or the second A-MPDU is encapsulated into an A-MPDU according to a protocol by using the baseband circuit 1130, baseband processing such as scrambling and encoding is performed on the A-MPDU obtained through encapsulation. The radio frequency circuit 1140 further performs radio frequency processing such as analog conversion, filtering, amplification, and up-conversion on an A-MPDU obtained through baseband processing, and then transmits an A-MPDU obtained through radio frequency processing through the antenna 1150. In another example, acknowledgment feedback information sent by the receive end is received through the antenna 1150, undergoes processing such as filtering, amplification, down-conversion, digitization, and the like performed by the radio frequency circuit 1140, undergoes baseband processing such as decoding and protocol-based data decapsulation performed by the baseband circuit 1130, and is processed by the processor 1110, to recover the acknowledgment feedback information sent by the receive end.

The memory 1120 may be configured to store program code and data of the transmit end. The memory 1120 may be the storage module 1130 in FIG. 11. It can be understood that the baseband circuit 1130, the radio frequency circuit 1140, and the antenna 1150 may be further configured to support communication between the transmit end and another network entity, for example, communication between the transmit end and a network element on a core network side. As shown in FIG. 11, the memory 1120 is separated from the processor 1110. However, it is readily figured out by a person skilled in the art that the memory 1120 or any part thereof may be located outside the channel resource allocation apparatus 1100. For example, the memory 1120 may include a transmission cable and/or a computer product separated from a wireless node. The media may be accessed by the processor 1110 through the bus interface 1160. Alternatively, the memory 1120 or any portion thereof may be integrated into the processor 1110, for example, the memory 1120 or any portion thereof may be a cache and/or a general purpose register.

It may be understood that, FIG. 11 shows only a simplified design of the transmit end. For example, in an actual application, the transmit end may include any quantity of transmitters, receivers, processors, memories, and the like, and all transmit ends that can implement the present invention fall within the protection scope of the present invention.

Figure 12:
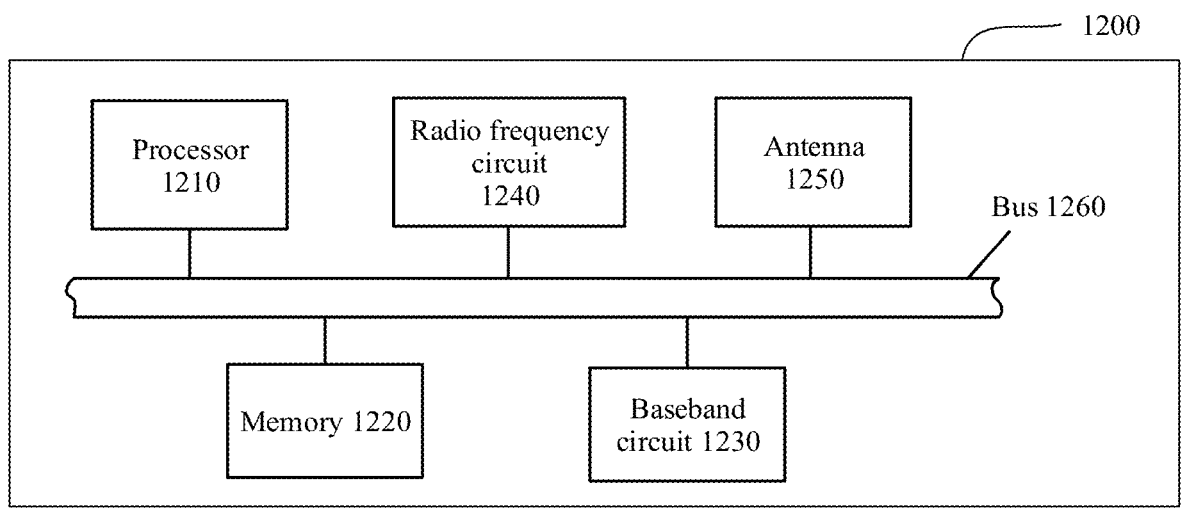
FIG. 12 is a schematic diagram of a structure of another receiving apparatus according to an embodiment of this application.

A schematic structure of the receiving apparatus is described in detail in the embodiments of this application. In an example, FIG. 12 is a schematic block diagram of a receiving apparatus 1200 according to an embodiment of this application. The apparatus 1200 in this embodiment of this application may be the receive end in any one of the foregoing method embodiments, or may be one or more chips in the receive end. The apparatus 1200 may be configured to perform some or all functions of the receive end in the foregoing method embodiments.

The apparatus 1200 may include a processor 1210, a baseband circuit 1230, a radio frequency circuit 1240, and an antenna 1250. Optionally, the apparatus 1200 may further include a memory 1220. Components of the apparatus 1200 are coupled together through a bus 1260. In addition to a data bus, the bus system 1260 includes a power bus, a control bus, and a status signal bus. However, for clear description, various types of buses in the figure are marked as the bus system 1260.

The processor 1210 may be configured to control the receive end, and configured to perform processing performed by the receive end in the foregoing embodiments. The processor 1210 may perform a processing process related to the transmit end in the foregoing method embodiments and/or configured to perform another process of the technology described in this application. Further, the processor 1210 may run an operating system, be responsible for managing the bus, and execute a program or instructions stored in the memory.

The baseband circuit 1230, the radio frequency circuit 1240, and the antenna 1250 may be configured to support information receiving and sending between the receive end and the transmit end in the foregoing embodiments, to support wireless communication between the receive end and the transmit end. In an example, a signal sent by the transmit end is received through the antenna 1250, undergoes processing such as filtering, amplification, down-conversion, and digitization performed by the radio frequency circuit, and undergoes baseband processing such as decoding and protocol-based data decapsulation performed by the baseband circuit. Then, the processor 1210 performs processing on the signal, to recover service data and signaling information that are sent by the transmit end. For example, the receive end decodes and decapsulates a received PPDU to obtain an A-MPDU, and then the A-MPDU is parsed by using the processor to obtain an MPDU. In still another example, acknowledgment feedback information of the receive end may be processed by the processor 1210, undergoes baseband processing such as protocol-based encapsulation and encoding performed by the baseband circuit 1230, undergoes radio frequency processing such as analog conversion, filtering, amplification, and up-conversion performed by the radio frequency circuit 1240, and is transmitted through the antenna 1250. The memory 1220 may be configured to store program code and data of the transmit end, and the memory 1220 may be a storage module. It may be understood that the baseband circuit 1230, the radio frequency circuit 1240, and the antenna 1250 may further be configured to support the receive end to communicate with another network entity.

It may be understood that, FIG. 12 shows only a simplified design of the receive end. For example, in actual application, the receive end may include any quantity of transmitters, receivers, processors, memories, and the like, and all receive ends that can implement the present invention fall within the protection scope of the present invention. The processor in each of the apparatus 1100 and the apparatus 1200 may be a general-purpose processor, for example, a general-purpose central processing unit (CPU), a network processor (NP), a microprocessor; or may be an application-specific integrated circuit (ASIC), or one or more integrated circuits configured to control program execution in the solutions of this application. The processor may be alternatively a digital signal processor (DSP), a field programmable gate array (FPGA) or other programmable logic device, discrete gate or transistor logic device, or a discrete hardware component. Alternatively, a controller/the processor may be a combination of processors implementing a computing function, for example, a combination of one or more microprocessors, or a combination of the DSP and the microprocessor. The processor usually performs logical and arithmetic operations according to program instructions stored in the memory.

Each of the memories in the apparatus 1100 and the apparatus 1200 may further store an operating system and another application program. Specifically, the program may include program code, and the program code includes computer operation instructions. More specifically, the memory may be a read-only memory (ROM), another type of static storage device that can store static information and instructions, a random access memory (RAM), another type of dynamic storage device that can store information and instructions, a disk memory, or the like. The memory may be a combination of the foregoing storage types. In addition, a computer-readable storage medium/the memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in a packaging material.

An embodiment of this application further provides a chip system. The chip system includes a processor and is configured to support a transmit end or a second receive end to implement the function in any of the foregoing embodiments, for example, generate or process data and/or information in the foregoing methods. In a possible design, the chip system may further include a memory. The memory is configured to store program instructions and data that are necessary for the transmit end or the receive end. The chip system may include a chip, or may include a chip and another discrete component.

An embodiment of this application further provides a processor, where the processor is configured to be coupled to a memory, and to perform a method and a function related to a transmit end or a receive end in any one of the foregoing embodiments. Optionally, the processor includes a processing circuit and a communication interface. An embodiment of this application further provides a computer program product including instructions. When the computer program product runs on a computer, the computer is enabled to perform a method and a function that are related to a transmit end or a receive end in any one of the foregoing embodiments. An embodiment of this application further provides an apparatus, where the apparatus is configured to perform a method and a function of a receive end or a transmit end in any one of the foregoing embodiments. An embodiment of this application further provides a wireless communication system. The system includes at least one transmit end and at least one receive end in any one of the foregoing embodiments.

In embodiments provided in this application, it should be understood that the disclosed system, apparatus, and method may be implemented in other manners. For example, the described apparatus embodiment is merely an example. For example, division into units is merely a logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, and the indirect couplings or communication connections between the apparatuses or units may be implemented in electronic, mechanical, or other forms. As still another possible product form, the data transmission apparatus may alternatively be implemented by using the following: a field programmable gate array (FPGA), a programmable logic device (PLD), a controller, a state machine, gate logic, a discrete hardware component, any other suitable circuit, or any combination of circuits that can perform various functions described in this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center integrating one or more usable media. The usable medium may be a magnetic medium (for example, a floppy disk, a hard disk, or a magnetic tape), an optical medium (for example, a DVD), a semiconductor medium (for example, a solid state disk), or the like.

What is claimed is:

1. A data unit sending method, comprising:
sending, by a transmit end, a first aggregated media access control protocol data unit (A-MPDU);
determining, by the transmit end, a media access control protocol data unit (MPDU) that needs to be retransmitted in the first A-MPDU, wherein the MPDU that needs to be retransmitted is comprised in a first A-MPDU subframe in the first A-MPDU, wherein the first A-MPDU subframe comprises a first MPDU delimiter, and wherein the first MPDU delimiter comprises a first end of frame (EOF) field and a first MPDU length field; and
sending, by the transmit end, a second A-MPDU, wherein the second A-MPDU comprises a second A-MPDU subframe, wherein the second A-MPDU subframe comprises the MPDU that needs to be retransmitted and a second MPDU delimiter, and wherein the second MPDU delimiter comprises a second EOF field and a second MPDU length field;
wherein a value of the second EOF field is the same as a value of the first EOF field, and a value of the second MPDU length field is the same as a value of the first MPDU length field;
wherein a value of a buffered traffic size field in a frame header of the MPDU that needs to be retransmitted in the second A-MPDU is the same as a value of a buffered traffic size field in a frame header of the MPDU that needs to be retransmitted in the first A-MPDU.

2. The method according to claim 1, wherein the first A-MPDU subframe comprises a first padding field, the second A-MPDU subframe comprises a second padding field, and a value of the first padding field is the same as a value of the second padding field.

3. The method according to claim 1, wherein a value of a retry bit in the frame header of the MPDU that needs to be retransmitted in the second A-MPDU is the same as a value of a retry bit in the frame header of the MPDU that needs to be retransmitted in the first A-MPDU.

4. The method according to claim 3, wherein the value of the retry bit in the frame header of the MPDU that needs to be retransmitted in the second A-MPDU is set to 0.

5. The method according to claim 1, wherein based on every MPDU in the first A-MPDU being an MPDU that needs to be retransmitted, the second A-MPDU further comprises a second end of frame padding field located after the second A-MPDU subframe, and the first A-MPDU further comprises a first end of frame padding field located after the first A-MPDU subframe, wherein a value of the second end of frame padding field is the same as a value of the first end of frame padding field.

6. The method according to claim 5, wherein the first A-MPDU is carried in a first physical layer protocol data unit (PPDU), and the second A-MPDU subframe is carried in a second PPDU; and
wherein the first PPDU comprises a first pre-forward error correction (pre-FEC) padding located after the first A-MPDU, and the second PPDU comprises a second pre-FEC padding located after the second A-MPDU, wherein the first pre-FEC padding is the same as the second pre-FEC padding.

7. A data unit receiving method, comprising:
receiving, by a receive end, a first aggregated media access control protocol data unit (A-MPDU);
receiving, by the receive end, a second A-MPDU, wherein the second A-MPDU comprises a second A-MPDU subframe, wherein the second A-MPDU subframe comprises an MPDU of the first A-MPDU that needed to be retransmitted, wherein the MPDU that needed to be retransmitted is from a first A-MPDU subframe of the first A-MPDU, wherein the first A-MPDU subframe comprises a first MPDU delimiter, wherein the first MPDU delimiter comprises a first end of frame (EOF) field and a first MPDU length field, wherein the second A-MPDU subframe comprises a second MPDU delimiter, wherein the second MPDU delimiter comprises a second EOF field and a second MPDU length field, wherein a value of the second EOF field is the same as a value of the first EOF field, and wherein a value of the second MPDU length field is the same as a value of the first MPDU length field; and
performing, by the receive end, combining and decoding or joint decoding on a log-likelihood ratio (LLR) of a coded bit corresponding to the first A-MPDU subframe and an LLR of a coded bit corresponding to the second A-MPDU subframe, to obtain the MPDU that needed to be retransmitted;
wherein a value of a buffered traffic size field in a frame header of the MPDU that needed to be retransmitted in the second A-MPDU is the same as a value of a buffered traffic size field in a frame header of the MPDU that needed to be retransmitted in the first A-MPDU.

8. The method according to claim 7, wherein the first A-MPDU subframe comprises a first padding field, the second A-MPDU subframe comprises a second padding field, and a value of the first padding field is the same as a value of the second padding field.

9. The method according to claim 7, wherein a value of a retry bit in the frame header of the MPDU that needed to be retransmitted in the second A-MPDU is the same as a value of a retry bit in the frame header of the MPDU that needed to be retransmitted in the first A-MPDU.

10. The method according to claim 9, wherein the value of the retry bit in the frame header of the MPDU that needed to be retransmitted in the second A-MPDU is set to 0.

11. The method according to claim 7, wherein based on every MPDU in the first A-MPDU being an MPDU that needed to be retransmitted, the second A-MPDU further comprises a second end of frame padding field located after the second A-MPDU subframe, and the first A-MPDU further comprises a first end of frame padding field located after the first A-MPDU subframe, wherein a value of the second end of frame padding field is the same as a value of the first end of frame padding field.

12. The method according to claim 11, wherein the first A-MPDU is carried in a first physical layer protocol data unit (PPDU), and the second A-MPDU subframe is carried in a second PPDU; and
wherein the first PPDU comprises a first pre-forward error correction (pre-FEC) padding located after the first A-MPDU, and the second PPDU comprises a second pre-FEC padding located after the second A-MPDU, wherein the first pre-FEC padding is the same as the second pre-FEC padding.

13. A non-transitory computer-readable storage medium having processor-executable instructions stored thereon, wherein the processor-executable instructions, when executed by at least one processor, facilitate:
sending, by a transmit end, a first aggregated media access control protocol data unit (A-MPDU);
determining, by the transmit end, a media access control protocol data unit (MPDU) that needs to be retransmitted in the first A-MPDU, wherein the MPDU that needs to be retransmitted is comprised in a first A-MPDU subframe in the first A-MPDU, wherein the first A-MPDU subframe comprises a first MPDU delimiter, and wherein the first MPDU delimiter comprises a first end of frame (EOF) field and a first MPDU length field; and
sending, by the transmit end, a second A-MPDU, wherein the second A-MPDU comprises a second A-MPDU subframe, wherein the second A-MPDU subframe comprises the MPDU that needs to be retransmitted and a second MPDU delimiter, and wherein the second MPDU delimiter comprises a second EOF field and a second MPDU length field;
wherein a value of the second EOF field is the same as a value of the first EOF field, and a value of the second MPDU length field is the same as a value of the first MPDU length field;
wherein a value of a buffered traffic size field in a frame header of the MPDU that needs to be retransmitted in the second A-MPDU is the same as a value of a buffered traffic size field in a frame header of the MPDU that needs to be retransmitted in the first A-MPDU.

14. The non-transitory computer-readable storage medium according to claim 13, wherein the first A-MPDU subframe comprises a first padding field, the second A-MPDU subframe comprises a second padding field, and a value of the first padding field is the same as a value of the second padding field.

15. The non-transitory computer-readable storage medium according to claim 13, wherein a value of a retry bit in the frame header of the MPDU that needs to be retransmitted in the second A-MPDU is the same as a value of a retry bit in the frame header of the MPDU that needs to be retransmitted in the first A-MPDU.

16. The non-transitory computer-readable storage medium according to claim 15, wherein the value of the retry bit in the frame header of the MPDU that needs to be retransmitted in the second A-MPDU is set to 0.

17. The non-transitory computer-readable storage medium according to claim 13, wherein based on every MPDU in the first A-MPDU being an MPDU that needs to be retransmitted, the second A-MPDU further comprises a second end of frame padding field located after the second A-MPDU subframe, and the first A-MPDU further comprises a first end of frame padding field located after the first A-MPDU subframe, wherein a value of the second end of frame padding field is the same as a value of the first end of frame padding field.

18. The non-transitory computer-readable storage medium according to claim 17, wherein the first A-MPDU is carried in a first physical layer protocol data unit (PPDU), and the second A-MPDU subframe is carried in a second PPDU; and wherein the first PPDU comprises a first pre-forward error correction (pre-FEC) padding located after the first A-MPDU, and the second PPDU comprises a second pre-FEC padding located after the second A-MPDU, wherein the first pre-FEC padding is the same as the second pre-FEC padding.

\* \* \* \* \*